Figure 1:
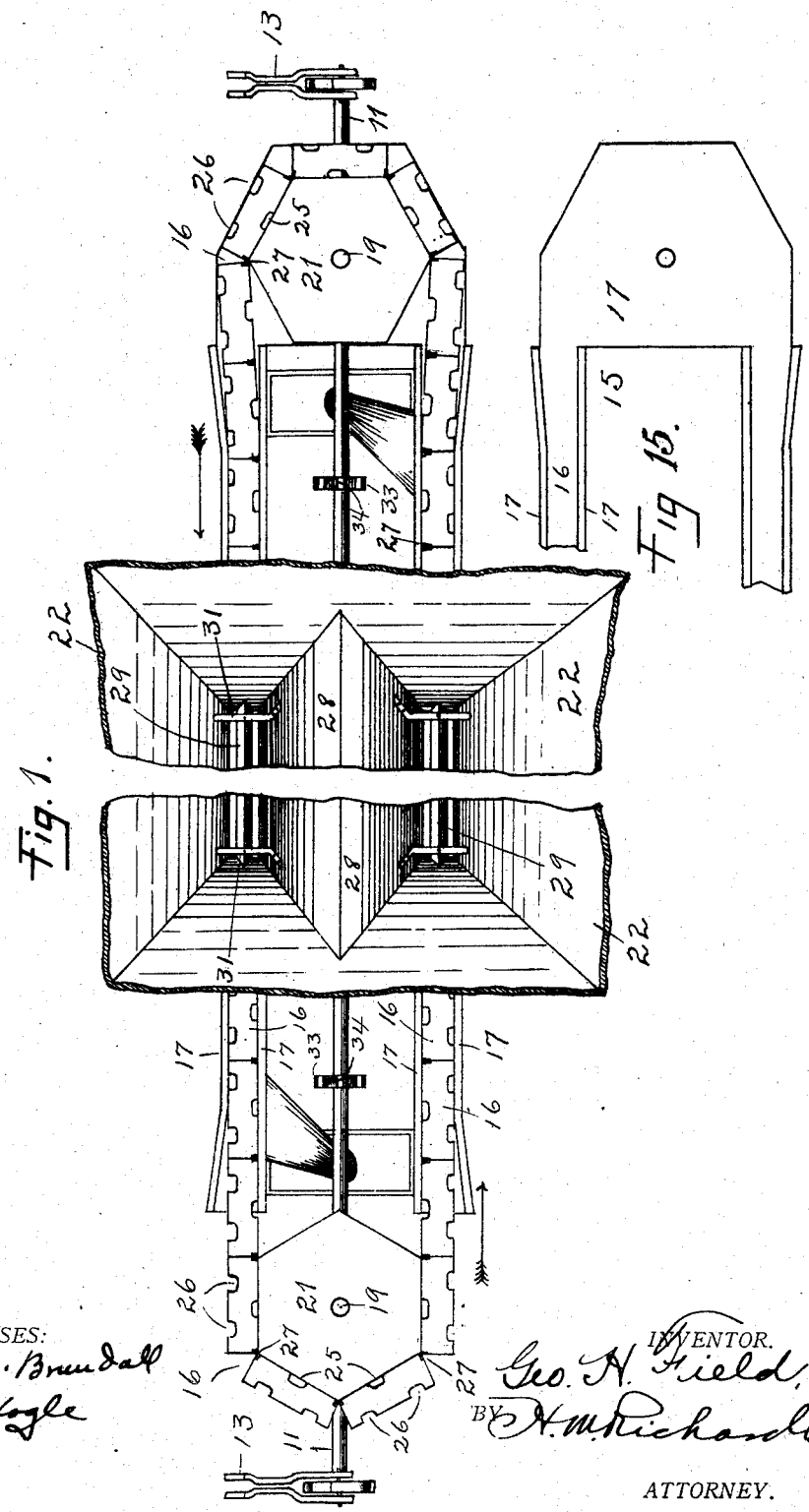

No. 864,523. PATENTED AUG. 27, 1907.
G. H. FIELD.
CORN PLANTER.
APPLICATION FILED NOV. 28, 1906.

5 SHEETS—SHEET 3.

WITNESSES:

INVENTOR.
Geo. H. Field.
BY
ATTORNEY.

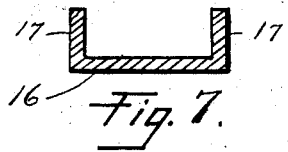
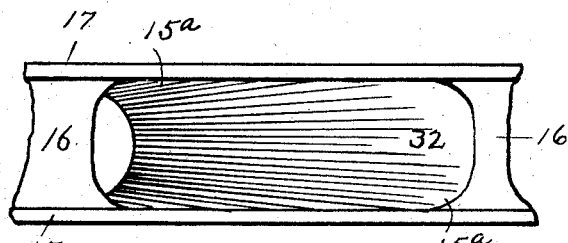
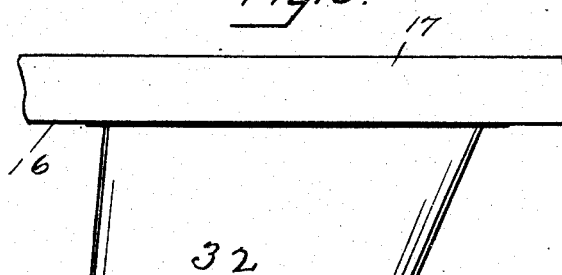
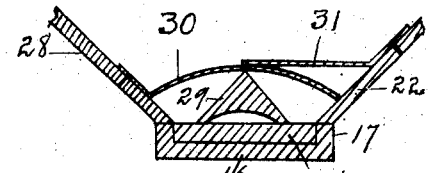

No. 864,523. PATENTED AUG. 27, 1907.
G. H. FIELD.
CORN PLANTER.
APPLICATION FILED NOV. 28, 1906.

5 SHEETS—SHEET 5.

WITNESSES:
Harry N. Brandall
Edwin C. Hogle

INVENTOR.
Geo. H. Field,
BY
H. M. Richards,
ATTORNEY.

UNITED STATES PATENT OFFICE.

GEORGE H. FIELD, OF RUSHVILLE, ILLINOIS.

CORN-PLANTER.

No. 864,523.  Specification of Letters Patent.  Patented Aug. 27, 1907.

Application filed November 28, 1906. Serial No. 345,559.

*To all whom it may concern:*

Be it known that I, GEORGE H. FIELD, a citizen of the United States, residing at Rushville, in the county of Schuyler and State of Illinois, have invented a certain new and useful Corn-Planter, of which the following is a specification.

While the main features of my invention relate to and may be embodied in planters of various kinds, such main features are herein described and shown in the drawings as incorporated in a device of the character described in which the forward frame carries a single centrally located hopper or seed-box.

In varying localities and even in portions of land lying in close proximity the soil will differ greatly as regards the fertility and productivity thereof, and in order to obtain the greatest results in crop it becomes necessary to proportion or predetermine the number of grains or charge of seed to be deposited in each hill consistent with the strength or productivity of the soil or its potency to grow and mature a crop to the greatest efficiency as these conditions exist, in order that the operator may be positive as to the number of seed periodically deposited.

The primary object of my invention is to produce a planter which will render accurately and positively the deposition of one or any predetermined plurality of grains or kernels of seed in each hill or at each periodic movement of the seeding mechanism.

It is a well known fact to those skilled in the art of planting corn that grains or kernels thereof may best be separated from the quantity in the source of seed supply by manipulating or handling them on edge, as a lesser number of varying conditions exist when they are in said position. I am aware that this has been accomplished in planters provided with rotary seed-cup plates and disks, but in such type of planters said cups failed in effectually separating single kernels from the supply in the seed-box, due principally to clogging, the result being that large numbers of hills were planted with fewer grains than desired.

To the end of overcoming these objections and defects a further object of my invention is to provide an elongated seed-box or hopper through which passes a feed-chain each link of which is provided with a series of seed-cups or apertures, (in the present instance three, one in one side of the link and two in the opposite side) and each seed-cup so constructed and proportioned that it will with certainty separate a single grain from the mass in the source of seed-supply during its extended path of travel therethrough, arrange it edgewise and convey it to the seed delivering mechanism.

In this connection another object of the invention is to provide suitable means by which that portion of the chain which is traveling between the seed spouts may be supported, which means serves the further purpose of preventing the seed falling from the cups or apertures or from turning on the side while within the hopper or before reaching the seed spouts.

Another object is to provide an endless seed-cup chain having a continuous but step-by step motion in one direction, traveling in and out through the hopper.

Still another object of the invention is to provide a simple and effective means for accurately guiding the seed to the respective sides of the chain aforesaid.

A yet further object is to provide a simple, strong and effective means for driving said chain.

A still further object is to provide a removable measuring device whereby the amount or number of grains delivered to each seed-cup link may be predetermined, the same chain being employed.

A further object is to overcome a difficulty hitherto met with in planters employing rotary seed-plates, or in those thereof in which the plates do not start to revolve until the forked lever has completed its throw or stroke, making it necessary for the plate to be speeded up so as to travel a sufficient distance to deposit the required number of grains, while the supporting or ground wheels are covering about one half the distance between the hills. In other words, to wait until the fork has completed its stroke and then deposit three grains of seed and stop a sufficient length of time for the fork to begin again to act necessarily revolves the seed-plate at great speed while the ground wheels are traveling at but a comparatively slow speed, resulting in grains being frequently thrown out of the seed-cups and the grain dribbled or scattered. This I accomplish by the employment of a seed-chain which travels a comparatively great distance through the source of seed supply and which has but a relatively slow speed.

A further object is to provide a construction in which the seed-cups themselves perform the functions of agitators.

A further object is to dispense with a cut-off, a portion of the hopper taking the place thereof.

A further object is to eliminate danger of crushing kernels of seed.

A further object is to provide an enlarged opening into which the kernels of seed are discharged from the seed-cups, thus averting danger of carrying grains past, and resulting in an incomplete hill.

A further object is to reduce the friction, thus producing a lighter draft.

A further object is to provide a planter which may be readily and quickly converted from a hill to a drill planter, or vice versa.

A further object is to prevent clogging by reason of too many grains entering a seed-cup.

With these and many other objects in view, which will readily appear as the nature of the invention is better understood, the same consists in novel structural features and combinations of devices, the operation of which devices separately and in combination will be found hereinafter fully described and set forth in the claims hereto appended.

Mechanism showing the structural features, arrangement, connection and mutual relationship of the several parts of my improvements and the adjacent parts of the forward frame of a machine in which the improvements are incorporated is illustrated in the accompanying drawings, in which said improvements are embodied in the best way now known to me; obviously, however, some of the improvements may be used without the others and in machines differing in construction, type and operation from the one shown in said drawings in which:—

Figure 2:
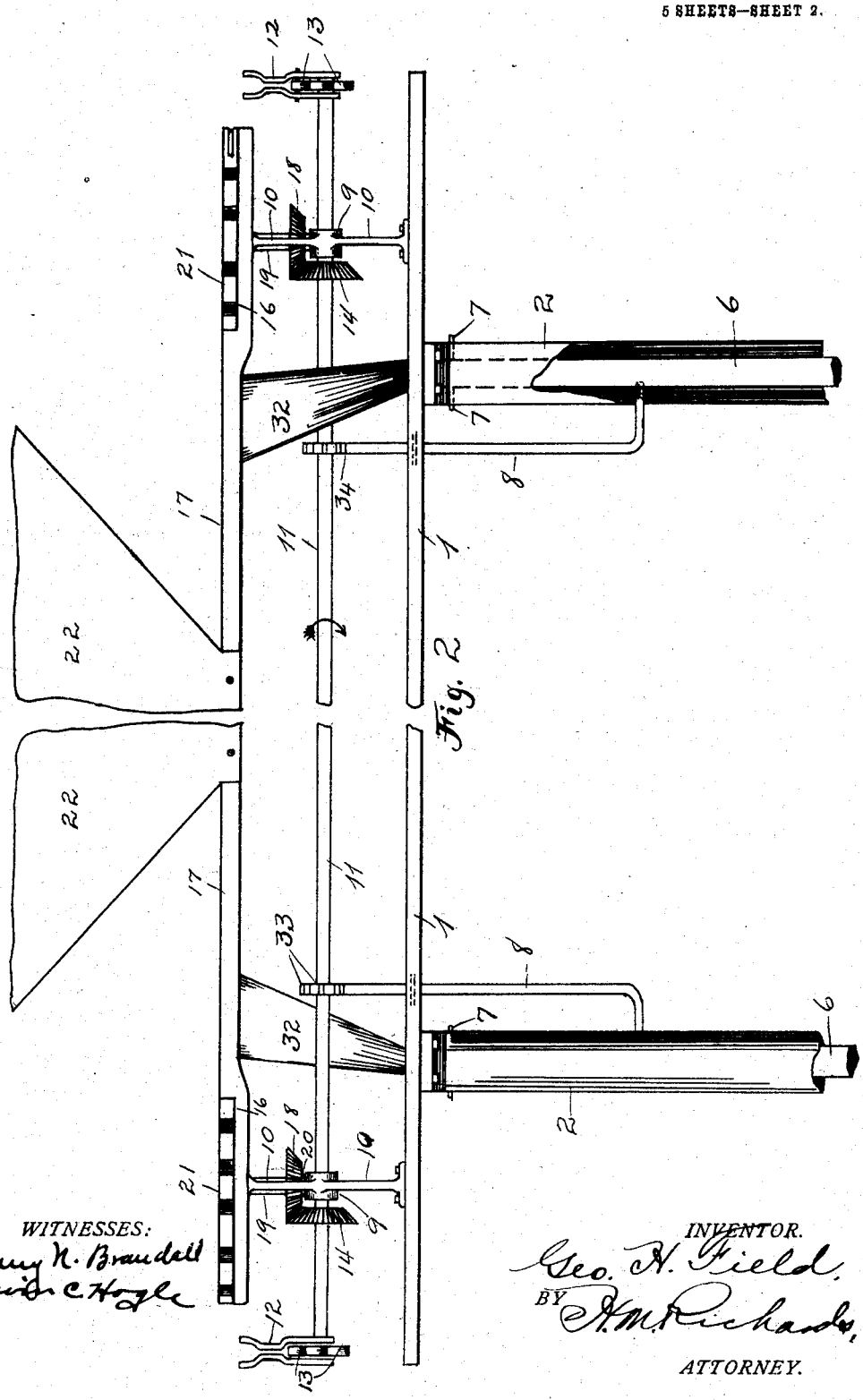
Figures 3, 4:
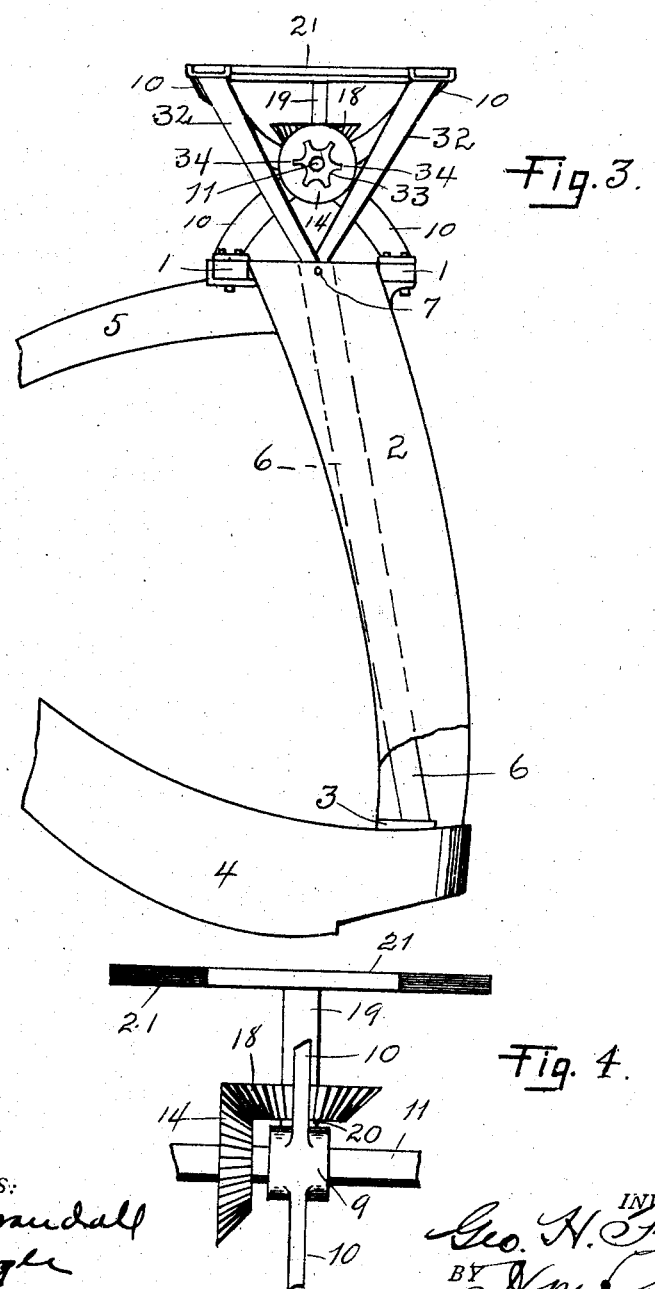
Figure 8:
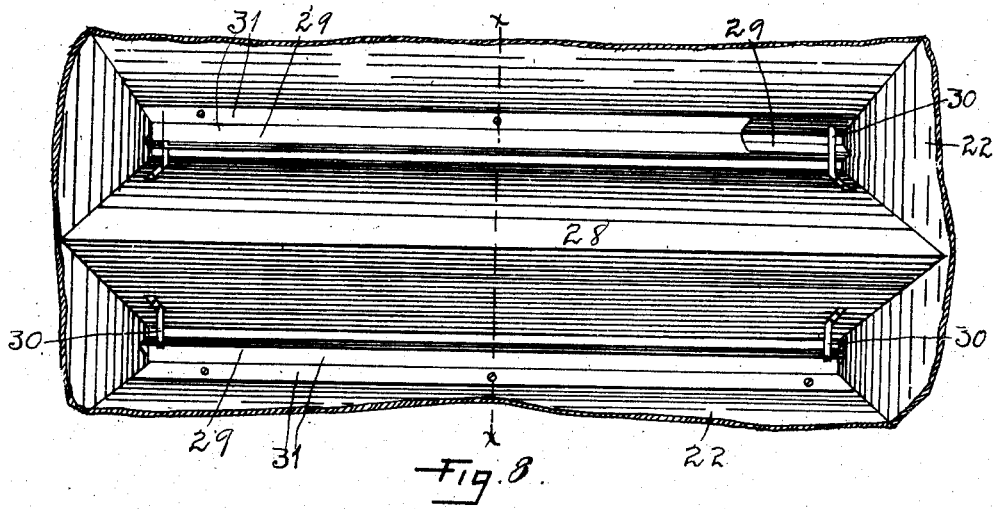
Figure 9:
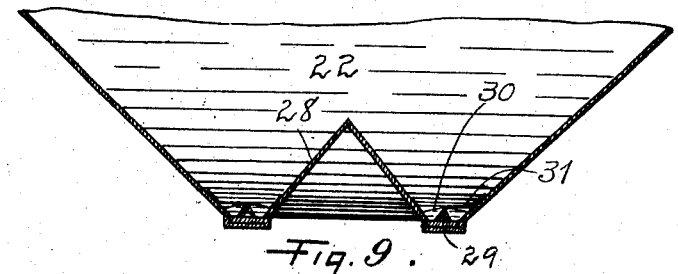
Figure 10:
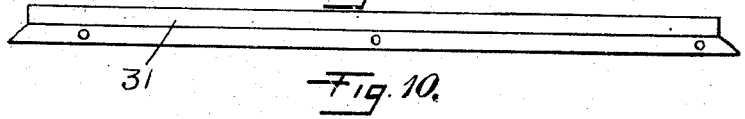
Figure 11:
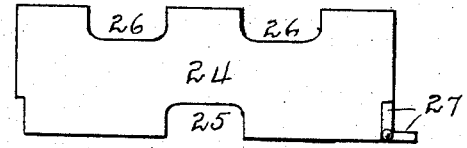
Figure 12:
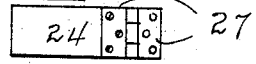
Figure 13:

Figure 1 is a top plan of a portion of a planter, partly broken away; Fig. 2, a rear elevation, partly broken away; Fig. 3, a side elevation, partly broken away, showing the seed-chain driving mechanism, its supports, and portions of the dropping mechanism; Fig. 4, an enlarged detail of portions of parts shown at Fig. 3; Fig. 5, a detail, greatly enlarged, partly broken away, of a flute, guide channel and seed-tube or spout; Fig. 6, a top plan of the flute, showing also a fragment of the guide channel; Fig. 7, a cross sectional view of the channel; Fig. 8, an enlarged top plan, partly broken away, of the hopper and its contained parts; Fig. 9, a sectional view of the parts shown at Fig. 8, the plane of section being in the line X—X in Fig. 8; Fig. 10, a detail of the measuring plate or cut-off; Fig. 11, a top plan of one of the chain links, showing also one form of hinge; Fig. 12, an end view of the same, showing the hinge in a different position from that shown at Fig. 12; Fig. 13, a side elevation of the same; Fig. 14, an enlarged fragmental sectional view of the hopper bottom, seen from one end, and Fig. 15, a top plan of the chainway.

In the several figures of the drawings above described the same reference numeral indicates respectively the same part.

Reference being now had thereto, 1, 1 represent the ordinary frame bars of a corn planter, 2, the legs, each provided with a shelf 3, and 4 the runners or furrow openers, each of which is preferably connected at its front end by an arm 5 to a forward frame-bar not shown.

A seed duct or tube 6 is pivoted at 7 within and to the upper end of each standard or leg to permit its lower end to rest normally upon the shelf 3, which as shown is located closely above the heel of the runner, and to be tripped rearwardly by a lever 8 as presently described.

Mounted to rotate in bearings 9 in support 10 bolted or otherwise fixed on the frame bars is a shaft 11, see Figs. 2, 3 and 4. At each of its ends the shaft 11 carries a check row lever 12 which may be provided with any ordinary mechanism 13 which will impart intermittent rotary motion to said shaft and thereby to a miter wheel 14 keyed or otherwise fixed thereon. The upper legs of the standards 10 support a continuous chainway 15, the central portion of which is a channel, or in other words a web 16 with rectangular flanges 17 projecting therefrom and is provided with seed openings 15ª. Near its extremities the flanges are discontinued and the distance between the respective sides of the web increased. Indeed, that portion of the web beyond the channel may be disklike if preferred, the particular construction thereof being immaterial.

In gear with each miter wheel 14 is a similar wheel 18 fixed on a vertical shaft 19, the lower end of which is seated to rotate in a bearing 20 in a standard or support 10 and carries on its upper end a multiangular wheel 21, the one shown being hexagonal. The tappets on the usual check row wire—not shown—are spaced at such distance apart that they will at each impulse against the lever 12 give a one-sixth revolution to the shaft 11, which partial revolution will in an evident manner be transmitted to the hexagonal wheel just described, for a purpose hereinafter explained. The check row fork is given a return throw in any common or preferred manner which will not cause a motion of the rotary shaft in a direction contrary to that last described.

Traversing the chainway 15, passing through the ends of the seed box 22 (hereinafter described) and driven by the wheel 21 is my improved feed-chain or seed-cup chain composed of a series of like links 24 each having, as shown in the present instance, a single centrally longitudinally located seed-cup or aperture 25 in one of its edges and provided with two seed-cups 26 in its opposite edge.

It is a fact that grains or kernels of any of the many varieties of field corn, whether grown in the same or different localities or on soils of like or unlike productive qualities, (except they be from dwarfed or immature ears or from the point or tip of the ear) while exhibiting considerable differences in their width and length, are approximately the same in thickness. Because of this natural similarity I have constructed each seed-cup or aperture in each link of such length, width and depth that a kernel can only enter a seed-cup while on its edge and with either an edge or end downward, see Figs. 11, 12 and 13. It will be evident, however, that even with seed-cups of other construction than that shown, wherein the opening is elongated longitudinally and contracted laterally, my chain will be operative, in fact of great value in drilling corn or in planting seed not having the natural physical peculiarities and structural features of kernels of corn. The links of the chain are shown as united by an ordinary construction of hings 27. The method of uniting them, however, is of little importance further than that it be operative, such as will permit the chain to pass freely around the multiangular wheel. The construction of hinge ordinarily used in carpenter's rules, comprising a compound semicircular joint centrally pivoted would be practical, simple and effective. In fact, other means than said wheel may be employed for driving the chain.

The seed-box 22 hereinbefore referred to is externally of ordinary construction but of such length as to permit of a sufficient number of chain links to be passing through or traversing the channel therein to insure each and every seed-cup separating a single grain from the mass, and is preferably bolted to the outer flange of each channel as indicated at Fig. 2, by a stove-bolt or in any manner which will not interfere with the action of the chain. The ends and sides are flared to a degree sufficient to cause the grains to fall to their proper positions for readily entering the seed-cups. To facilitate this I have provided a bridge or parting wall 28 arranged longitudinally of the hopper, the sides of which wall are flared in a direction contrary to that of the side walls of the hopper. As I have hereinbefore stated, the channel extends longitudinally throughout the hopper on each side thereof and the chain traverses it continually but intermittently. To most positively insure the feed of the kernels to the cups on the respective sides of the links I have provided at each side of the hopper a triangular seed-guide 29 having preferably a concave base, which guide extends the full length thereof and is of such width at its base as to only cover the space between the seed cups at the respective sides of the link. Each guide is supported at its apex with its base slightly above the chain by arms 30 fixed at one end to the bridge wall 28 and its free end resting against the proximal inclined side of the hopper or vice versa.

When it is desired, because of the inferior condition of the soil hereinbefore set forth, or for any other reason, to plant a less number of seed in a hill than there are cups in a link, a cut-off or measuring plate 31, see Figs. 8, 9, 10 and 14, may be screwed or otherwise fixed to cover one or the other side of the link, so that but either one or two cups is exposed to the mass in the hopper. The operation will be evident and need not be further described.

Fixed to the web of the chainway, (one to the front and one to the rear portions thereof) below openings therein, are flutes or conducting tubes 32, the tapered lower ends of which enter the throats of the respective seed-ducts 6. Fixed on the shaft 11 intermediate the flutes are tripping wheels 33 provided each with trippets 34. Pivoted in any preferred manner is an ordinary lever, the upper end of which is adapted to be contacted and tripped by said trippets and the lower end of which is fixed to the seed-tube 6. This tripping lever forms no part of my invention and is hereby disclaimed.

The operation is as follows:—The hopper having been filled and the planter being started on its path across the field in the usual manner, a knot or tappet on the wire will draw the forked lever backwardly, as also in an ordinary manner, to give a partial rotation (as hereinbefore stated, in the present instance a one-sixth,) to the shaft 11, which movement will be transmitted through the medium of the miter wheels 14, 18 and the vertical shaft 19 to the hexagonal chain-driving wheels 21 and thereby to the feed chain. Each of the six sides of the wheel being equal in length to that of a link, the chain will be advanced at each intermittent or step-by-step movement of the shaft the length of three seed-cups, at each side of the planter it being understood that the measuring plate is not being employed. When those two links which were nearest the respective ends of the hopper have reached the opening in the channel and over the mouth of the flute their contained charges of three grains each will fall by gravity thereinto, down through the seed-duct and onto the shelf, where they will be retained thereby until another operation as that last described is performed, whereupon the trippets on the wheel 33 will contact and trip the levers 8 to throw the lower ends of the seed-ducts rearwardly from the shelf, whereby the charge of seed resting thereupon will be swept or scraped therefrom and by gravity fall through the split heel of the runner or furrow opener and be deposited in the ground, the duct returning itself and the lever by its own gravity to a more nearly vertical and normal position. Successive like operations will produce successive like results. The method of applying the measuring plate or cut-off and the result produced thereby have been before described.

It will be manifest that the walls or flanges of the channel preclude any grain or grains entering the seed-cups in any other position than on edge while within the hopper. It will be further clear and manifest that said flanges will effectually retain said grains in that position until they have arrived at the point where they fall into the flute.

Preferably the operator will before starting give a sufficient number of impulses to the forked lever to bring a filled link over the opening to deposit its charge on the shelf, so that the next movement of the lever will at once open the valve and cause said charge to be deposited in the ground.

While I have illustrated and described the preferred embodiment of the invention, it will be understood that without departing from the essential spirit and scope or sacrificing any of the advantages of the invention, it is susceptible of change as regards its form, proportion, detail, construction, organization, and the mutual relationship, coöperation and combinations of parts.

Having thus set forth the construction and operation, the purposes and advantages of my invention, I claim as new and desire to secure by Letters Patent the following, namely;

1. In a planter, a chain-link provided with seed-cups in an edge thereof.

2. In a planter, a chain-link provided with seed-cups on opposite edges thereof.

3. In a planter, a chain comprising links each of which is provided with seed cups in its opposite edges.

4. In combination, a chain comprising links each of which is provided with seed-cups, and a hopper through which it travels for retaining the seed therein.

5. In combination, a chain comprising links each of which is provided with seed cups in their edges, and a chainway through which it travels for retaining the seed therein.

6. A chain-link for planters, provided with seed-cups in its edges elongated longitudinally thereof.

7. A chain-link for planters, provided with seed-cups in its edges contracted laterally thereof.

8. In a planter, the combination with a centrally located seed-hopper, of a chain adapted to pass therethrough, the links thereof provided with seed-cups in their edges.

9. In a planter, the combination with a centrally located seed-hopper, of a seed-cup chain adapted to pass therethrough, the links of said chain provided with seed-cups in its edges.

10. In a planter, in combination, a seed-hopper, a chainway located therein, and a seed-cup chain traversing said way, the links of said chain provided with seed-cups in their edges.

11. In a planter, in combination, a seed-hopper, a chainway including sides and a bottom located therein, and a seed-cup chain traversing said way, the links of said chain provided with end-cups in their edges.

12. In a planter, in combination, a seed-hopper, a chainway, a chain the links thereof provided with seed-cups in their edges traversing said hopper and way, and means for driving the chain.

13. In a planter, in combination, a seed-hopper, a chainway, a chain the links thereof provided with seed-cups in their edges traversing the way, and multiangular wheels traversed by and actuating said chain.

14. In a planter, in combination, a seed-hopper, a chainway provided with seed-apertures, and a chain the links thereof provided with end cups in their edges traversing said hopper and way and adapted to deliver seed to said openings.

15. In a planter, in combination, a seed-hopper, a parting wall arranged therein, a chainway at the sides thereof, and a seed-cup chain traversing said way.

16. In a planter, in combination, a seed-hopper, a parting wall arranged therein, a chainway at the sides thereof extending beyond the hopper and including sides and a bottom, and a seed-cup chain traversing said way.

17. In a planter, in combination, a seed-hopper, a chainway arranged therein, a chain provided with seed-cups traversing said way, and means for closing a portion of the cups.

18. A hopper for planters provided with seed openings, a longitudinally and centrally disposed parting wall, a longitudinally disposed seed-guide partly overlying each of said openings, and means for suspending it thereabove.

19. In a planter, a chain provided with seed-cups in its edges, a source of seed supply through which it passes, and means for supporting that portion of the chain which is exterior to said seed-supply source.

20. In a planter, a chain provided with seed-cups in its edges, a source of seed supply through which it passes and means for retaining the seed within said cups, said means provided with an aperture for releasing the seed.

21. In a planter, a chain provided with seed-cups in its edges, a source of seed supply through which it passes, means for driving it, and channel for retaining the seed within the cups, said channel or way provided with an aperture for releasing the seed.

22. In a planter, a chain provided with seed-cups in its edges, a source of seed-supply through which it passes, means for actuating it, a chainway comprising sides and a bottom through which it travels, said chainway members adapted to retain the seed within the cups after passing from said supply source, and said bottom provided with a seed-releasing aperture.

23. In a planter, a chain provided with seed-cups in its edges, a source of seed-supply through which it passes, means for actuating it, means for supporting it, and a cut-off within said supply source for regulating the number of grains supplied to each link.

24. In a planter, a chain provided with seed-cups in its edges, a source of seed-supply through which it passes, and a detachable cut-off within said supply source whereby the number of grains supplied to each chain-link may be predetermined.

25. In a planter, a chain composed of links provided with seed-cups in opposite edges thereof, a source of seed-supply through which it passes, and detachable means within said source of supply for covering one side of each link but not the other whereby the number of grains supplied to each link may be predetermined.

26. In a planter, in combination, a seed hopper, a parting wall arranged therein, a chainway at the sides thereof and extending beyond the hopper, multiangular wheels, and a seed-cup chain traversing said way and wheels and driven by the latter.

27. In a planter, and in combination, a seed-cup chain comprising links having seed-cups in its edges elongated longitudinally thereof and contracted laterally thereof, and a way for said chain including vertical walls.

28. In a planter and in combination, a seed-cup chain comprising links having seed-cups elongated longitudinally thereof and contracted laterally thereof, and a way for said chain including vertical walls and a bottom, said bottom provided with apertures.

29. In combination with a seed-tube and flute, an overlying chainway provided with an aperture registering with the aperture in the flute, and a chain provided with seed-cups in its edges.

30. In a planter and in combination, a rotary shaft, means for actuating it, a miter gear driven by said shaft, a hopper, a chainway therein provided with seed-openings, a seed-cup chain traversing it, and means intermediate said gear and chain for actuating the latter.

31. In a planter and in combination, a rotary shaft, means for actuating it, a hopper, a chainway therein provided with seed-apertures, a seed-cup chain traversing it, a multiangular wheel traversed by and transmitting motion to said chain, and means intermediate said shaft and wheel for actuating the latter.

32. In combination, a rotary shaft, a miter gear actuated thereby, multiangular wheels driven by said gear, a hopper, a chainway partly therein provided with seed openings, a seed-cup chain traversing said way and wheels and receiving motion from the latter, flutes depending from said way, planter legs, and seed-ducts therein adapted to receive grain from said flutes.

33. In a planter, a chain, the links thereof provided with end-cups in their edges, a source of seed-supply in which said chain has movement, and means whereby a portion of said seed may be cut off from the supply.

34. In a planter, a chain, the links thereof provided with seed-cups in their edges, a centrally located source of seed supply through which said chain is adapted to travel, and means whereby a portion of said seed may be cut off from the supply.

35. In a planter, a chain including seed-cups in its edges and a centrally located source of seed supply which said chain is adapted to traverse.

36. In a planter, a chain including seed-cups in its edges, a source of seed supply through which said chain passes, and means whereby a predetermined portion of seed may be cut off from the supply.

37. In a planter, a chain including seed-cups in its edges, a source of seed supply through which said chain passes, and detachable means whereby a predetermined portion of the seed may be cut off from the supply.

GEORGE H. FIELD.

Witnesses:
H. M. RICHARDS,
C. S. RICHARDS.